(12) United States Patent
Glesser et al.

(10) Patent No.: US 12,157,239 B2
(45) Date of Patent: Dec. 3, 2024

(54) KNIFE WITH INTEGRAL SEALED POWER SOURCE

(71) Applicant: Spyderco, Inc., Golden, CO (US)

(72) Inventors: Louis Sal Glesser, Evergreen, CO (US); Eric Glesser, Evergreen, CO (US)

(73) Assignee: SPYDERCO, INC., Golden, CO (US)

( * ) Notice: Subject to any disclaimer, the term of this patent is extended or adjusted under 35 U.S.C. 154(b) by 1056 days.

(21) Appl. No.: 16/736,613

(22) Filed: Jan. 7, 2020

(65) Prior Publication Data

US 2020/0215705 A1 Jul. 9, 2020

Related U.S. Application Data

(60) Provisional application No. 62/789,517, filed on Jan. 7, 2019.

(51) Int. Cl.
*B26B 11/00* (2006.01)
*B26B 1/04* (2006.01)
(Continued)

(52) U.S. Cl.
CPC .............. *B26B 11/008* (2013.01); *B26B 1/04* (2013.01); *B26B 1/10* (2013.01); *F21L 4/08* (2013.01);
(Continued)

(58) Field of Classification Search
CPC . B26B 11/008; B26B 1/04; B26B 1/10; F21L 4/08; F21V 33/008; H02J 7/02;
(Continued)

(56) References Cited

U.S. PATENT DOCUMENTS 3,394,277 A 7/1968 Satkunas et al.
4,031,449 A 6/1977 Trombly
(Continued)

FOREIGN PATENT DOCUMENTS

CN 2127901 3/1993
CN 201120619 9/2008
(Continued)

OTHER PUBLICATIONS

"Victorinox Swiss Army USB Flash Laser Pointer Pocket Knife," Your Electronic Warehouse, 2019, 1 page [retrieved online from: www.4electronicwarehouse.com/victorinox-swiss-army-usb-flash-laser-pointer-pocket-knife-p20247].
(Continued)

*Primary Examiner* — Richard Isla
*Assistant Examiner* — Manuel Hernandez
(74) *Attorney, Agent, or Firm* — Sheridan Ross P.C.

(57) ABSTRACT

A folding knife is provided with a power storage device that can be charged and recharged by a charge component that wirelessly receives power from a remote source. In some embodiments, the folding knife can have a device that consumes energy such as a light, a camera, a microphone, an audio speaker, etc. The power storage device and the charge component can be positioned in a scale of the handle where the substantially planar shapes of the scale, the power storage device, and the charge component are oriented in a common direction. In some embodiments, the cavities, recesses, and channels in the first scale that house these components and linking wires are strategically positioned to leave a reinforcing area that provides strength and stiffness to the handle. Various features are also described herein that improve safety of the charging system.

6 Claims, 8 Drawing Sheets

(51) Int. Cl.
*B26B 1/10* (2006.01)
*F21L 4/08* (2006.01)
*F21V 33/00* (2006.01)
*H02J 7/02* (2016.01)
*H02J 50/10* (2016.01)
*H02J 50/12* (2016.01)
*H02J 50/20* (2016.01)
*H02J 7/34* (2006.01)

(52) U.S. Cl.
CPC ............. *F21V 33/008* (2013.01); *H02J 7/02* (2013.01); *H02J 50/12* (2016.02); *H02J 50/20* (2016.02); *H02J 7/345* (2013.01); *H02J 50/10* (2016.02)

(58) Field of Classification Search
CPC .. H02J 7/345; H02J 50/12; H02J 50/20; H02J 50/10
USPC ............................................ 30/123; 320/108
See application file for complete search history.

(56) References Cited

U.S. PATENT DOCUMENTS

| | | | |
|---|---|---|---|
| 4,397,055 | A | 8/1983 | Cuchiara |
| 4,644,937 | A | 2/1987 | Hommann |
| 4,985,998 | A | 1/1991 | Howard |
| 5,313,376 | A | 5/1994 | McIntosh |
| 5,321,865 | A | 6/1994 | Kaeser |
| 5,442,529 | A | 8/1995 | Hoover |
| 5,613,259 | A | 3/1997 | Craft et al. |
| 5,615,484 | A | 4/1997 | Pittman |
| 5,626,414 | A | 5/1997 | Chen |
| 5,727,319 | A | 3/1998 | Myerchin et al. |
| 6,553,672 | B2 | 4/2003 | Glesser et al. |
| 6,751,868 | B2 | 6/2004 | Glesser |
| 6,805,090 | B2 | 10/2004 | Bertness et al. |
| 6,918,184 | B2 | 7/2005 | Glesser |
| 6,972,543 | B1 | 12/2005 | Wells |
| 7,305,769 | B2 | 12/2007 | McHenry et al. |
| 7,726,031 | B1 | 6/2010 | Gibbs |
| 8,022,674 | B2 | 9/2011 | Miura |
| 8,305,044 | B2 | 11/2012 | Kawamoto et al. |
| 8,671,578 | B1 | 3/2014 | Frazer |
| 8,745,878 | B2 | 6/2014 | Glesser |
| 8,975,764 | B1 | 3/2015 | Abehasera |
| 9,687,987 | B2 | 6/2017 | Bloch et al. |
| 10,116,167 | B2 | 10/2018 | Pomp-Melchers |
| 10,116,172 | B2 | 10/2018 | Fischer et al. |
| 10,154,460 | B1 | 12/2018 | Miller et al. |
| 10,170,918 | B2 | 1/2019 | Zadesky et al. |
| 2004/0187313 | A1* | 9/2004 | Zirk .................. F21V 33/0084 362/119 |
| 2006/0087845 | A1 | 4/2006 | Yeh |
| 2007/0035917 | A1 | 2/2007 | Hotelling et al. |
| 2007/0186351 | A1 | 8/2007 | Linn et al. |
| 2009/0256361 | A1 | 10/2009 | Theuss et al. |
| 2009/0264044 | A1 | 10/2009 | Paculdo |
| 2010/0085739 | A1 | 4/2010 | Webb et al. |
| 2012/0081886 | A1* | 4/2012 | Brown .................. B26B 11/008 362/119 |
| 2015/0057653 | A1 | 2/2015 | Sugiyama |
| 2015/0359565 | A1 | 12/2015 | Matsui |
| 2016/0056664 | A1* | 2/2016 | Partovi .................. H02J 7/0042 307/104 |
| 2017/0080583 | A1* | 3/2017 | Esteban Gonzalez ....................... B26B 11/008 |
| 2018/0099423 | A1* | 4/2018 | Mundhra ................ B26B 1/044 |
| 2018/0212466 | A1 | 7/2018 | Schaefer et al. |
| 2019/0006882 | A1 | 1/2019 | Leem |
| 2021/0347067 | A1 | 11/2021 | Glesser et al. |
| 2021/0402626 | A1* | 12/2021 | Heimendinger .......... B26B 7/00 |
| 2022/0234224 | A1 | 7/2022 | Glesser et al. |
| 2022/0234225 | A1 | 7/2022 | Glesser et al. |

FOREIGN PATENT DOCUMENTS

| | | | | |
|---|---|---|---|---|
| CN | 102848405 | | 1/2013 | |
| CN | 205651518 | | 10/2016 | |
| CN | 106113096 | A * | 11/2016 | |
| CN | 107234639 | | 10/2017 | |
| CN | 107932563 | | 4/2018 | |
| CN | 108160234 | | 6/2018 | |
| CN | 108888336 | | 11/2018 | |
| CN | 213829066 | | 7/2021 | |
| ES | 1058526 | | 12/2004 | |
| JP | 5789338 | | 10/2015 | |
| WO | WO-2007089915 | A2 * | 8/2009 | ............. B25F 1/003 |
| WO | WO 2015/150601 | | 10/2015 | |

OTHER PUBLICATIONS

"BRITE-BLADE™ Tactical Lighted Survival Knife," Brite-Strike Technologies Inc., 2017, 7 pages.
"NEBO 6715 PAL LED Flashlight Power Bank 400 Lumens," eBay Inc., 2019, 6 pages.
"Personalized Pocket Knife—Lock Back—Flashlight Combo—Steel," AGiftPersonalized, 2019, 4 pages.
"Special Force Pocket Knife With LED Flashlight," Swords, knives and Daggers, LLC, 2018, 7 pages.
"Sting Blade 22,000,000 Knife Stun Gun Flashlight Combo," Defense Divas, 2019, 7 pages.
"Tool Logic SL1 Flashlight-Knife Combo," The Miller Your Buddy the Gun Enthusiast, Apr. 2012, 6 pages.
"Wireless Qi-certified Cellphone Fast Charger with Mug Warmer/Drink Cooler," eBay Inc., 2019, 4 pages.
UNG "Hands-on with WiTricity's wireless charging for laptops," PCWorld, Jan. 7, 2016, 9 pages [retrieved online from: https://www.pcworld.com/article/3019437/hands-on-with-witricitys-wireless-charging-for-laptops.html].
"Nebo Swyvel, Compact 1,000 Lumen Rechargeable EDC Flashlight with a 90° Rotating Swivel Head," Alliance Sports Group, L.P., Feb. 2020, 2 pages [retrieved online from: www.nebotools.com/p/SWYVEL/751].

* cited by examiner

KNIFE WITH INTEGRAL SEALED POWER SOURCE

CROSS REFERENCE TO RELATED APPLICATIONS

This application claims priority to U.S. Provisional Patent Application Ser. No. 62/789,517, filed Jan. 7, 2019, entitled "Knife with Integral Sealed Power Source", the entire disclosure of which is hereby expressly incorporated by reference in its entirety.

FIELD

The present disclosure relates to cutting instruments and more specifically to knives with integral sealed power sources and/or power storage devices.

BACKGROUND

Cutting instruments have been used for centuries by craftsmen, hunters, and others requiring a sharp cutting instrument. Pocket knives are commonly carried by sportsmen, craftsmen and other users who desire a compact, portable blade which can be safely folded and transported in a pocket or attached to a belt. More recently, fixed length knives have been replaced with popular folding knives, which generally have two positions. In an open or extended position of use, the knife cutting blade is extended to expose the blade cutting edge and permit cutting and use. In a closed position, the cutting edge of the blade is stored within a cavity or channel in the handle portion of the knife, thus preventing the blade from being exposed. Folding knives typically have a first scale and a second scale that form the handle portion of a folding knife, and may include a locking mechanism to secure the blade in a desired position.

Many sportsmen and other knife users may carry additional devices that require power, for example, a light. In some instances, users may want the additional device integrated into the knife for a variety of applications such as emitting light ahead of a blade for a cutting or thrusting action. Moreover, a vibrating mechanism can cause the blade to move in a sawing motion and some users can benefit from a heated handle in cold weather. These additional accessories or devices consume electric power, and traditional batteries can be utilized, but traditional batteries present several issues. These batteries need to be periodically inserted and removed from battery compartments, which can provide a pathway for external elements such as water to degrade the electronic components and even some of the structural components of the folding knife. Batteries with a single or limited number of uses are also harmful to the environment.

Inductive charging of integrated batteries or capacitors has been used by various industries and devices. For example, Oral-B rechargeable toothbrushes by the Braun company have used inductive charging since the early 1990s. Smart phones have been charged wirelessly via inductive charging since around 2013. Electric toothbrushes and newer smart phones are also often "sealed" to prevent damage from exposure to water. An inductively charged toothbrush can rest on the charger without any metal contacts to connect the toothbrush to the base. This has the advantage of allowing the toothbrush to be completely sealed so that water cannot enter through exposed contacts. It also avoids any problems with water getting into the contacts and shorting out the charger and creating rust on exposed metal contacts. In this inductive charging arrangement, the toothbrush and the base form a two-part transformer with the base having one part of the transformer and the toothbrush having the other. The base contains one of the coils and the metal bar, and the toothbrush contains the second coil. When the toothbrush slides onto the base, the complete transformer is created and the electric charge can flow to the battery in the toothbrush.

U.S. Pat. No. 6,553,672 to Glesser et al. discloses a folding knife with a compression locking mechanism, and is incorporated by reference herein in its entirety. U.S. Pat. No. 6,918,184 to Glesser discloses a folding knife lock with an integral stop pin, and is incorporated by reference herein in its entirety. U.S. Pat. No. 6,751,868 to Glesser discloses a folding knife with a substantially spherical locking mechanism, and is incorporated by reference herein in its entirety. U.S. Pat. No. 5,615,484 to Pittman discloses a cam lock for a folding knife blade, and is incorporated by reference herein in its entirety. U.S. Pat. No. 4,985,998 to Howard discloses a folding knife with a blade lock, and is incorporated by reference herein in its entirety.

The following patents disclose various aspects of inductive charging and are incorporated herein by reference in their entireties: U.S. Pat. No. 3,394,277 to Satkunas et al. for "Driving Unit for Electric Toothbrush"; U.S. Patent Publication No. 2018/0212466 to Schaefer et al. for "Personal Care Product Docking System with Flux Guiding Members"; U.S. Pat. No. 10,116,167 to Pomp-Melchers for "Inductive Power Transmission Device"; U.S. Pat. No. 10,116,172 to Fischer et al. for "Charging Device and Hand-Held Device for a Small Mobile Electrical Device"; U.S. Pat. No. 10,154,460 to Miller et al. for "Power Management for Wearable Devices"; U.S. Patent Publication No. 2019/0006882 to Leem entitled "Transmission Coil Module for Wireless Power Transmission"; U.S. Pat. No. 4,031,449 to Trombly for "Electromagnetically Coupled Battery Charger"; U.S. Pat. No. 6,972,543 to Wells for "Series Resonant Inductive Charging Circuit"; U.S. Pat. No. 10,170,918 to Zadesky et al. for "Electronic Device Wireless Charging System"; and U.S. Patent Publication No. 2007/0035917 Hotelling et al. for "Methods and Apparatuses for Docketing a Portable Electronic Device that has a Planar Like Configuration and that Operates in Multiple Orientations."

SUMMARY

It is an aspect of embodiments of the present disclosure to provide a folding knife with an integrated power storage device and a charge component that is configured to wirelessly receive power from a remote source to charge and recharge the integrated power storage device. The power storage device can then power various devices and components of the folding knife such as a light positioned at a fore end of the handle. Various aspects and embodiments of the present disclosure overcome unique issues with the wireless transmission of power to a folding knife and are described in further detail below.

One aspect of embodiments of the present disclosure is to provide a folding knife with a sealed power storage device and a sealed charge component arranged in a common plane. A folding knife has a planar shape, and the components of the knife, such as the scales and the blade, also have planar shapes and move relative to each other. Therefore, the minimal thickness dimensions of these components constrain the physical space for housing a power storage device and a charge component. In some embodiments, the power storage device and the charge component also have substantially planar shapes and are a positioned in one or more cavities of the scales. The planar shapes of the power storage device and the charge component are aligned with the planar shape of the scale to accommodate these components in the scale. Further, these components are sealed to prevent damage to the electrical components within the knife. For example, the user may drop the knife in the sink, river, an animal, etc. and would not have to worry about the effects of the water or other moisture on the power storage device, charge component, or other electrical or metal components.

Another aspect of embodiments of the present disclosure is to provide a folding knife with a sealed power storage device that may be charged using wireless charging, for example, inductive charging, electromagnetic resonance, or short-wavelength wireless power transfer. Wireless power transmission transfers electrical energy from a transmitter to a receiver using the principle of induction of a magnetic field. An electric motor or a transformer using the principle of electromagnetic induction has been used since the 1800's, and since that time methods of transferring electricity by emitting electromagnetic waves such as laser or radio waves have been attempted. Wireless energy transfer methods that have been achieved thus far may be broadly divided into a magnetic induction method, an electromagnetic resonance method, and a radio frequency (RF) transmission method using a short-wavelength radio frequency. Such wireless power transfer technology has been used in industries such as information technology, rail, and consumer electronics.

It is an aspect of embodiments of the present disclosure to provide a folding knife with a charge component that wirelessly receives power via magnetic induction. This technology utilizes a phenomenon whereby, when two coils are arranged close to each other and current is applied to one coil, a magnetic flux is generated to generate electromotive force in the other coil. The magnetic induction method may transmit power of a maximum of several hundred kilowatts (kW) and may have high efficiency.

It is another aspect of embodiments of the present disclosure to provide a folding knife with a charge component that wirelessly receives power via an electromagnetic resonance method. This technology utilizes an electric field or a magnetic field, rather than using electromagnetic waves, current or the like. The electromagnetic resonance method is hardly influenced by an electromagnetic wave, and therefore is harmless to other electronic appliances or humans.

It is a further aspect of embodiments of the present disclosure to provide a folding knife with a charge component that wirelessly receives power via a short-wavelength wireless power transfer method, which is referred to in brief as an RF transmission method. This technology utilizes a method of directly transmitting and receiving energy in the form of radio waves. This technology employs a rectenna, which is a portmanteau of "antenna" and "rectifier", and means an element that directly converts RF power into direct current (DC) power. Therefore, the RF transmission method is a technology of converting alternating current (AC) radio waves into DC radio waves and using DC radio waves.

It is another aspect of embodiments of the present disclosure to provide a charge base that wirelessly transmits power to the charge component of the folding knife. The folding knife may have an aperture to receive a protrusion located on a charge base such that the folding knife securely remains on and positioned in the correct position on the charge base. Within the knife handle and circumscribing the aperture is a complimentary primary coil such that the secondary coil of the charge base lies within the electrical induction field of the primary coil. In this manner, the secondary coil is so energized to produce a current for recharging the power storage device in the knife handle. Electrical circuitry within the handle or the charge base prevents over-charging of the power storage device.

In some embodiments of the present disclosure, connected in circuit with the power storage device is an induction coil, and the induction coil is mounted upon a spool of ferrous metal. Clamped on the rearward end of the power storage device is a cup-shaped bottom cap. This cap is secured to and firmly held in a cupped flange of a bracket holder. The bracket holder has a cylindrical portion extending from the cupped portion to within the spool and around the central recessed portion of the base cover. Thus, the induction coil is firmly held on the spool which in turn is snugly engaged on the bracket which in turn snugly fits over the central recessed portion. The induction coil is therefore firmly held to and in axial alignment with the power storage device.

Snugly interposed between and in engagement with the end of the spool and the cupped flange is a flat portion of an induction ring of ferrous material. This induction ring has the flat portion thereof disposed normal to the axis of the ring and the outer cylindrical portion of the ring disposed parallel to the axis of the ring. The outer cylindrical portion of the ring is in close proximity to the wall of the scale and extends radially outward as far as possible and yet within the confines of the scale. The cylindrical portion of the ring is spaced substantially radially outward from the power storage device and cap mounted on the bottom thereof. This induction ring of ferrous material is thus in a good and efficient position for receiving charging flux provided by a charge base having a coil within which the lower end of the casing, holding the induction coil, is positioned for the purpose of charging the power storage device by the process of induction charging.

Further, some folding knives utilize magnets to selectively couple the handle of the folding knife to a charge base. In such configurations, a first docking magnet can be coupled to the knife handle and a second docking magnet can be coupled to the charge base. When the folding knife is brought into contact with the charge base, the magnetic fields of the docking magnets can hold the folding knife in place. As described above, however, the internal space available for positioning the docking magnet may undesirably limit the placement location of the docking magnets. Further, for knives that also utilize inductive charging systems, the magnetic fields generated by the docking magnets may decrease the efficacy of the inductive charging system. In order to mitigate undesirable interference from the magnetic fields of the docking magnets, the distance between the docking magnets and various components of the inductive charging system may be increased. However, increasing this distance may limit options with regard to how the knife can be docked to the charge base or otherwise undesirably impact the design or operation of the knife.

The present disclosure fulfills the needs described above by, in one embodiment, providing a folding knife with a charging system comprising a charge base, a first permanent magnet positioned within the charge base, and a base charging coil positioned within the charge base. The folding knife with a charging system further comprises a handle removably mounted to the charge base and a power storage device positioned within the handle. A second permanent magnet is positioned within the handle that is configured to generate an attraction force sufficient to hold the handle to the charge base when placed in proximity to the first permanent magnet. A handle charging coil is positioned within the handle. The base charging coil is configured to generate a magnetic field that penetrates the second charging coil to charge the power storage device when placed in proximity to the handle charging coil. The folding knife with a charging system further comprises a handle flux guiding member or shield having at least a portion positioned within the handle charging coil and a stand flux guiding member having at least a portion positioned within the base charging coil.

In another embodiment, a knife with a charging system comprises a charge base, a first permanent magnet positioned within the charge base, and a charge coil positioned within the charge base. A handle is removably mounted to the charge base. A rechargeable power storage device is positioned within the handle of the folding knife. A second permanent magnet is also positioned within the handle and configured to generate an attraction force sufficient to hold the handle to the charge base when placed in proximity to the first permanent magnet. A handle coil is positioned within the handle. The charge coil is configured to generate a magnetic field that penetrates the handle coil to charge the rechargeable power storage device. The knife with a charging system also comprises a handle flux guiding member in close proximity to a surface of the first permanent magnet.

Besides penetrating the handle coil, the magnetic field generated during inductive charging can potentially also penetrate other components positioned within the handle. Additionally, the stray magnetic field can cause noise in conductive materials (e.g., integrated circuits, printed circuit board traces, etc.) and create electromagnetic interference issues. The stray magnetic field can also cause eddy currents in conductive objects, which can generate heat and decrease the magnetic field strength.

In order to mitigate various undesirable side effects of inductive charging, a handle flux guiding member and a base flux guiding member can be utilized. Each of the handle flux guiding member and the base flux guiding member can comprise a magnetic material that allows them to influence the magnetic field in its environment. A material such as ferrite, for instance, has a greater permeability to a magnetic field than air and therefore concentrates the magnetic field lines. By strategic placement of the handle flux guiding member and the stand flux guiding member, the magnetic field associated with the inductive charging system can be concentrated and shaped, such that the efficiency of the inductive charging system is improved and undesirable coupling effects with other components of the handle and the base are reduced. Further, the handle flux guiding member and the stand flux guiding member can screen or otherwise guide the flux from external sources that may produce magnetic fields that penetrate the handle coil.

In some embodiments of the present disclosure, a power transmission device for inductive energy transfer is provided. The power transmission device comprises a first stage adapted to be connected to a supply input voltage and adapted to convert the supply input voltage to an operating voltage. The power transmission device further includes a second stage comprising a resonant circuit connected to the first stage and adapted to generate an oscillating voltage from the operating voltage so as to generate a magnetic field for inductive transfer of energy from the power transmission device to a target device. A control circuit is connected to the second stage. The control circuit is adapted to detect a parameter value of the second stage and is adapted to start or stop amplification of the resonant circuit based on the detected parameter value.

In further embodiments of the present disclosure, a charging device having contactless transmission of electrical energy in order to supply energy to a folding knife is provided. An electronic circuit for feeding an inductive energy transmitter is designed to adapt energy fed to the inductive energy transmitter in accordance with energy drawn from the inductive energy transmitter. A power storage device of the folding knife interrupts the supply of a load when energy is fed into the power storage device by the inductive energy transmitter.

With regards to non-contact platforms, inductive coils can be placed in each device to transfer both power and data. The inductive coils are typically hidden from view behind the housings of each device and therefore they are more aesthetically pleasing than electrical contacts, which need to be exposed in order to operate effectively. Furthermore, inductively based systems are more robust than electrical contacts. For example, there are no contacts to wear out and/or oxidize.

In some cases, the interfacing systems need to be properly aligned in order to ensure proper connections and therefore efficient power and data transfer between the charge base and the folding knife. The alignment features may be fixed or adjustable, and may include such elements as pins, shelves, guides, reference surfaces, keyways, and the like. The alignment features may also provide visual alignment clues or fiduciaries for helping the user position the knife on the docking station.

One aspect of embodiments of the present disclosure is to provide a folding knife with an energy harvesting mechanism to collect energy generated by the user using or carrying the knife. The energy harvesting mechanism can be positioned in a scale of the folding knife and can be, for instance, a magnet positioned in an electromagnetic generator. Movement of the magnet induces a change in flux in the generator, which can be stored as electrical energy. In addition, other movements such as the blade relative to the handle can power one or more energy harvesting mechanisms in the folding knife.

Some exemplary advantages of aspects and embodiments described herein include, but are not limited to, (i) protected connections—no corrosion when the electronics are enclosed, away from water or oxygen in the atmosphere and less risk of electrical faults such as short circuit due to insulation failure, especially where connections are made or broken frequently; (ii) durability—without the need to constantly plug and unplug the device, there is significantly less wear and tear on the socket of the device and the attaching cable; (iii) increased convenience and aesthetic quality—no need for cables; and (iv) inductive charging systems can be operated automatically without dependence on people to plug and unplug, which results in higher reliability. With one or more power storage devices charged, the folding knife can power a number of components including, but not limited to, a light, a locking mechanism, an opening mechanism, a microphone, an audio speaker, a GPS beacon or device, a fitness tracker, a heart monitor, a receiver, a transmitter, a transceiver, a pH sensor, a position sensor, a hand warmer, a vibrating mechanism, a camera or video recorder, a communication device, a clock, etc.

A specific embodiment of the present disclosure is a folding knife that wirelessly receives power from a remote source, comprising a handle having a first scale and a second scale that define a channel positioned therebetween, wherein the first scale has a substantially planar shape and includes a charge cavity; a blade pivotally interconnected to a forward end of the handle, wherein the blade has a cutting edge, the blade is movable between a first closed position where the cutting edge is positioned in the channel and a second extended position where the cutting edge is positioned outside of the channel; and a charge component positioned in the charge cavity for wirelessly receiving power and transferring power to a power storage device positioned in the handle, wherein the charge component and the power storage device each have a substantially planar shape, and wherein the substantially planar shapes of the power storage device, the charge component, and the first scale are oriented in a common direction.

In some embodiments, the charge component is one of an inductive coil, a resonator coil, and an RF antenna. In various embodiments, the power storage device is one of a battery or a capacitor. In some embodiments, the planar shape of the power storage device has a ratio between a maximum dimension in a planar direction to a maximum dimension in a thickness direction that is greater than eight. In various embodiments, the folding knife further comprises a device electrically connected to a control unit, wherein at least one of the first scale, the second scale, a liner, a liner lock, a back lock, a pivot tie, or a split spring provides the electrical connection between the device and the control unit. In some embodiments, the power storage device is positioned in a storage cavity in the first scale, and a storage channel extends between the storage cavity and the charge cavity.

Another specific embodiment of the present disclosure is a folding knife that wirelessly receives power from a remote source, comprising a handle having a first scale and a second scale that define a channel positioned therebetween; a blade pivotally interconnected to a forward end of the handle, wherein the blade has a cutting edge, and the blade is movable between a first closed position where the cutting edge is positioned in the channel and a second extended position where the cutting edge is positioned outside of the channel; a charge cavity extending into an inner surface of the first scale; a charge component positioned in the charge cavity for wirelessly receiving power and transferring power to a power storage device positioned in the handle; and a plurality of channels extending into the inner surface of the first scale, wherein a device channel of the plurality of channels extends from a device recess or aperture to the charge cavity, and an activation channel of the plurality of channels extends from an activation recess or aperture to the charge cavity, and wherein a reinforcement area is defined between the device channel and the activation channel to increase a strength and stiffness of the first scale.

In some embodiments, the folding knife further comprises a plurality of cutout areas extending into an inner surface of the second scale, wherein a combined area of the plurality of cutout areas is larger than a combined area of the charge cavity and the plurality of channels. In various embodiments, the folding knife further comprises a control unit positioned in the charge cavity, wherein the charge component and the power storage device are electrically connected to the control unit; and a light positioned in the device recess or aperture, wherein a wire extends from the light, through the device channel to the control unit, and the control unit transfers power from the power storage device to the light upon the control unit receiving a signal. In various embodiments, the folding knife further comprises a control unit positioned in the charge cavity, wherein the charge component and the power storage device are electrically connected to the control unit; and a storage channel of the plurality of channels extends from a storage cavity to the charge cavity, wherein the power storage device is positioned in the storage cavity, and wherein a wire extends from the power storage device, through the storage channel, and to the control unit to electrically connect the power storage device and the control unit.

In some embodiments, the first scale, the charge component, and the power storage device each have a substantially planar shape, and wherein the substantially planar shapes of the power storage device, the charge component, and the first scale are oriented in a common direction. In various embodiments, the charge component and the power storage device are sealed in an enclosed volume against external elements such that a fluid outside of the enclosed volume cannot move into the enclosed volume. In some embodiments, the folding knife further comprises a control unit positioned in the charge cavity, wherein the charge component and the power storage device are electrically connected to the control unit; and an activation device positioned in the activation recess or aperture, wherein a wire extends from the activation device, through the activation channel, and to the control unit, and the activation device transmits a signal to the control unit through the wire.

A further specific embodiment of the present disclosure is a wireless charging system for a folding knife, comprising a folding knife having a handle with a first scale and a second scale that define a channel; a blade pivotally interconnected to a forward end of the handle, wherein the blade has a cutting edge, and the blade is movable between a first closed position where the cutting edge is positioned in the channel and a second extended position where the cutting edge is positioned outside of the channel; a first charge component positioned in the handle and configured to transfer power to a power storage device in the handle of the folding knife, wherein the first charge component comprises windings extending in a first plane; and a base having a second charge component that is configured to wirelessly transmit power to the first charge component, wherein the second charge component comprises windings extending in a second plane, and wherein the first and second plane are oriented substantially parallel to each other and offset from each other by less than 5 cm when an outer surface of one of the first scale or the second scale of the folding knife is placed on an upper surface of the base.

In various embodiments, the charging system further comprises a protrusion extending upward from the upper surface of the base that at least partially extends into the protrusion to locate the first charge component relative to the second charge component when the outer surface of one of the first scale or the second scale of the folding knife is placed on the upper surface of the base. In some embodiments, the charging system further comprises a position sensor in the handle of the folding knife, wherein the position sensor is configured to detect the blade in the first closed position and the blade in the second extended position, wherein the position sensor sends a signal to a control unit in the handle when the blade is in the second extended position, and the control unit activates a device in response to the signal. In various embodiments, the device is one of a light, a locking mechanism, an opening mechanism, a microphone, an audio speaker, a GPS beacon or device, a fitness tracker, a heart monitor, a receiver, a transmitter, a transceiver, a pH sensor, a position sensor, a hand warmer, a vibrating mechanism, a camera or video recorder, a communication device, or a clock.

In some embodiments, the charging system further comprises a position sensor in the handle of the folding knife, wherein the position sensor is configured to detect the blade in the first closed position and the blade in the second extended position, wherein the position sensor sends a signal to a control unit in the handle when the blade is in the first closed position, and the control unit prevents the power storage device from charging in response to the signal. In various embodiments, the position sensor is one of an inductive sensor, a mechanical contact switch, a momentary contact switch, or a photoelectric switch. In some embodiments, the charging system further comprises an electromagnetic shield positioned between the first charge component and the position sensor in the handle.

Another specific embodiment of the present disclosure is a knife that wirelessly receives power from a remote source, comprising a handle having a first scale and a second scale; a blade interconnected to a forward end of the handle, wherein the blade has a cutting edge; a charge cavity extending into an inner surface of the first scale; a charge component positioned in the charge cavity for wirelessly receiving power and transferring power to a power storage device positioned in the handle; and a plurality of channels extending into the inner surface of the first scale, wherein a device channel of the plurality of channels extends from a device recess or aperture to the charge cavity, and an activation channel of the plurality of channels extends from an activation recess or aperture to the charge cavity, and wherein a reinforcement area is defined between the device channel and the activation channel to increase a strength and stiffness of the first scale.

In some embodiments, the knife further comprises a plurality of cutout areas extending into an inner surface of the second scale, wherein a combined area of the plurality of cutout areas is larger than a combined area of the charge cavity and the plurality of channels. In various embodiments, the knife further comprises a control unit positioned in the charge cavity, wherein the charge component and the power storage device are electrically connected to the control unit; and a light positioned in the device recess or aperture, wherein a wire extends from the light, through the device channel to the control unit, and the control unit transfers power from the power storage device to the light upon the control unit receiving a signal. In some embodiments, the knife further comprises a control unit positioned in the charge cavity, wherein the charge component and the power storage device are electrically connected to the control unit; and a storage channel of the plurality of channels extends from a storage cavity to the charge cavity, wherein the power storage device is positioned in the storage cavity, and wherein a wire extends from the power storage device, through the storage channel, and to the control unit to electrically connect the power storage device and the control unit.

In various embodiments, the knife further comprises a control unit positioned in the charge cavity, wherein the charge component and the power storage device are electrically connected to the control unit; and an activation device positioned in the activation recess or aperture, wherein a wire extends from the activation device, through the activation channel, and to the control unit, and the activation device transmits a signal to the control unit through the wire. In some embodiments, the first scale, the charge component, and the power storage device each have a substantially planar shape, and wherein the substantially planar shapes of the power storage device, the charge component, and the first scale are oriented in a common direction, wherein the charge component and the power storage device are sealed in an enclosed volume against external elements such that a fluid outside of the enclosed volume cannot move into the enclosed volume. In various embodiments, the first scale and the second scale define a channel positioned therebetween, and the blade is pivotally interconnected to the forward end of the handle, and wherein the blade is movable between a first closed position where the cutting edge is positioned in the channel and a second extended position where the cutting edge is positioned outside of the channel.

The phrases "at least one," "one or more," and "and/or," as used herein, are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B, and C together.

Unless otherwise indicated, all numbers expressing quantities, dimensions, conditions, and so forth used in the specification, drawings, and claims are to be understood as being modified in all instances by the term "about."

The term "a" or "an" entity, as used herein, refers to one or more of that entity. As such, the terms "a" (or "an"), "one or more" and "at least one" can be used interchangeably herein. It will be appreciated that with the position of the blade or folding knife, "open" may be used herein interchangeably with "extended."

The use of "including," "comprising," or "having," and variations thereof, is meant to encompass the items listed thereafter and equivalents thereof as well as additional items. Accordingly, the terms "including," "comprising," or "having" and variations thereof can be used interchangeably herein.

It shall be understood that the term "means" as used herein shall be given its broadest possible interpretation in accordance with 35 U.S.C. § 112(f). Accordingly, a claim incorporating the term "means" shall cover all structures, materials, or acts set forth herein, and all of the equivalents thereof. Further, the structures, materials, or acts, and the equivalents thereof, shall include all those described in the summary, brief description of the drawings, detailed description, abstract, and claims themselves.

These and other advantages will be apparent from the disclosure contained herein. The above-described embodiments, objectives, and configurations are neither complete nor exhaustive. The Summary is neither intended nor should it be construed as being representative of the full extent and scope of the present disclosure. Moreover, references made herein to "the present disclosure" or aspects thereof should be understood to mean certain embodiments of the present disclosure and should not necessarily be construed as limiting all embodiments to a particular description. The present disclosure is set forth in various levels of detail in the Summary as well as in the attached drawings and Detailed Description and no limitation as to the scope of the present disclosure is intended by either the inclusion or non-inclusion of elements, components, etc. in this Summary. Additional aspects of the present disclosure will become more readily apparent from the Detailed Description particularly when taken together with the drawings.

BRIEF DESCRIPTION OF THE DRAWINGS

The accompanying drawings, which are incorporated in and constitute a part of the specification, illustrate embodiments of the disclosure and together with the general description of the disclosure given above and the detailed description of the drawings given below, serve to explain the principles of the disclosures.

To provide further clarity to the detailed description provided herein in the associated drawings, the following list of components and associated numbering are provided as follows:

| Component No. | Component |
| --- | --- |
| 2 | Folding Knife |
| 6 | Blade |
| 10 | Spine |
| 14 | Thumb Traction Surface |
| 18 | Aperture |
| 22 | Handle |
| 26 | First Scale |
| 30 | Pivot Point |
| 34 | Lock Feature |
| 38 | Lanyard Aperture |
| 42a, 42b | Light |
| 46 | Activation Device |
| 50 | Tip |
| 54 | Cutting Edge |
| 58 | Choil |
| 62 | Clip |

-continued

| Component No. | Component |
| --- | --- |
| 66 | Second Scale |
| 70 | Channel |
| 74 | Channel Width |
| 78a, 78b | Storage Cavity |
| 82 | Reinforcement Area |
| 86a, 86b, 86c | Storage Channel |
| 90 | Charge Cavity/Control Cavity |
| 94 | Lock Aperture |
| 98 | Pivot Recess |
| 102a, 102b | Light Recess |
| 106a, 106b | Light Channel |
| 110a, 110b, 110c | Activation Aperture |
| 114a, 114b, 114c | Activation Channel |
| 118a, 118b | Arm |
| 122 | Rib |
| 126 | Cutout Area |
| 130 | Backspacer |
| 134a, 134b | Power Storage Device |
| 138 | Control Unit |
| 142 | Charge Component |
| 146a, 146b, 146c | Power Wire |
| 150a, 150b | Light Wire |
| 154a, 154b, 154c | Activation Wire |
| 158 | Charge Base |
| 162 | Charge Component |
| 166 | Protrusion |
| 170 | Wing |
| 174 | Wing Height |
| 178 | Knife Width |
| 182 | Position Sensor |
| 186 | Shield |
| 190 | First Offset |
| 194 | Second Offset |
| 198 | Position Knife |
| 202 | Receive Power |
| 206 | Determine Status |
| 210 | Cease Reception |
| 214 | Provide Indication |
| 218 | Permit Reception |
| 222 | Provide Indication |

It should be understood that the drawings are not necessarily to scale, and various dimensions may be altered. In certain instances, details that are not necessary for an understanding of the disclosure or that render other details difficult to perceive may have been omitted. It should be understood, of course, that the disclosure is not necessarily limited to the particular embodiments illustrated herein.

DESCRIPTION

As described in detail below, various embodiments of the present disclosure include novel folding knife designs and configurations, comprising a sealed power storage device and charge component and/or other features or devices. The present disclosure has significant benefits across a broad spectrum of endeavors.

Figure 1A:
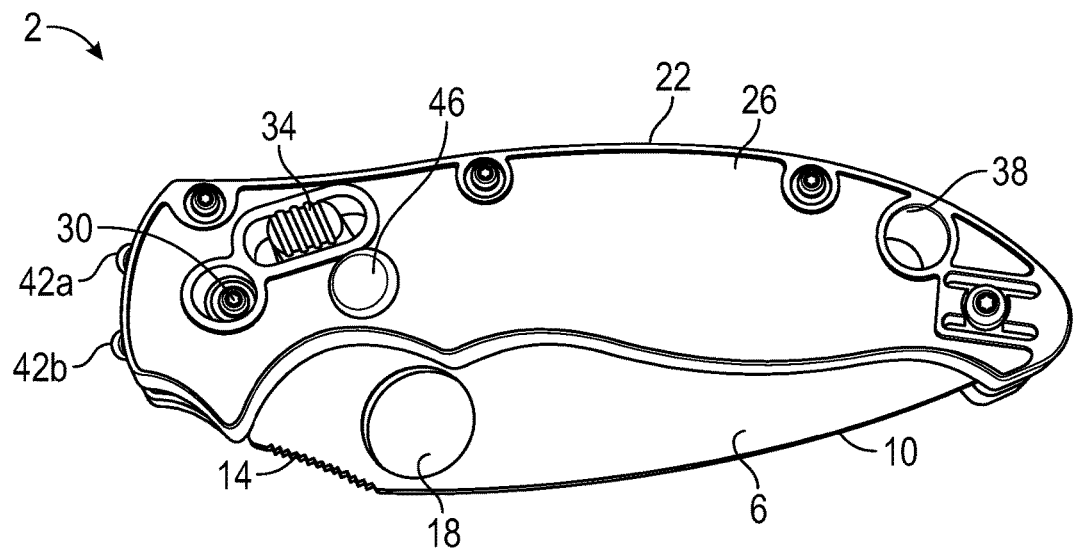
FIG. 1A shows a front perspective view of a folding knife with a blade in a closed position according to an embodiment of the present disclosure.
Figure 1B:
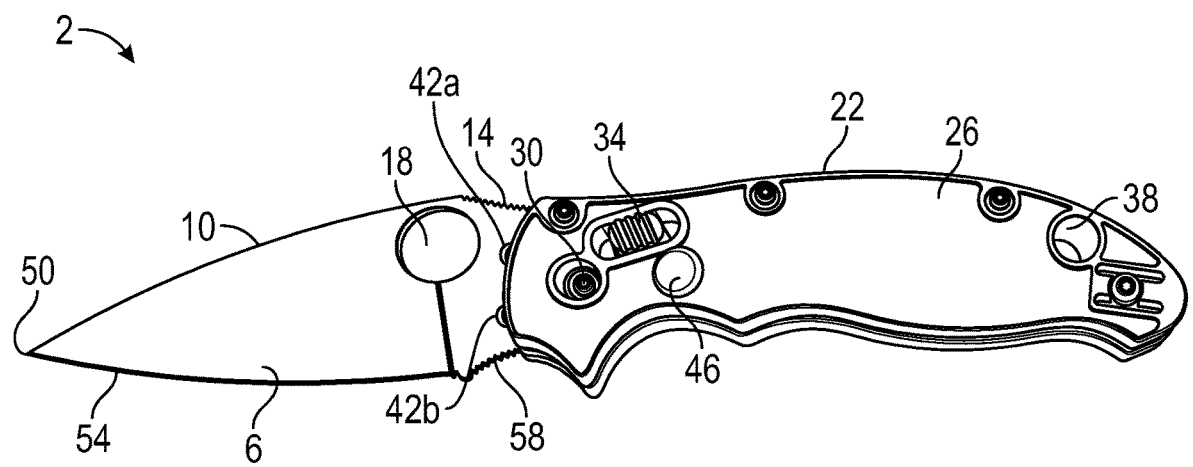
FIG. 1B shows a front perspective view of the folding knife in FIG. 1A with the blade in an open position according to an embodiment of the present disclosure.

Referring now to FIGS. 1A and 1B, front perspective views of a folding knife 2 in a closed position and an open position, respectively, are provided. The folding knife 2 generally has a handle 22 and a blade 6 that rotates relative to the handle 22 between the closed position and the open position. As shown, the blade 6 has a spine 10, a cutting edge 54, and a tip 50 positioned at a distal end of the blade 6 between the spine 10 and the cutting edge 54. The blade 6 can have further features such as a thumb traction surface 14 and a choil 58 that provide enhanced grip surfaces for a user. The blade 6 also has an aperture 18 that can assist a user in rotating the blade 6 about a fixed pivot pin 30 from the closed position to the open position. The blade 6 is typically metal, but can be any known material such as ceramic, fiberglass, or plastic.

Figure 2:
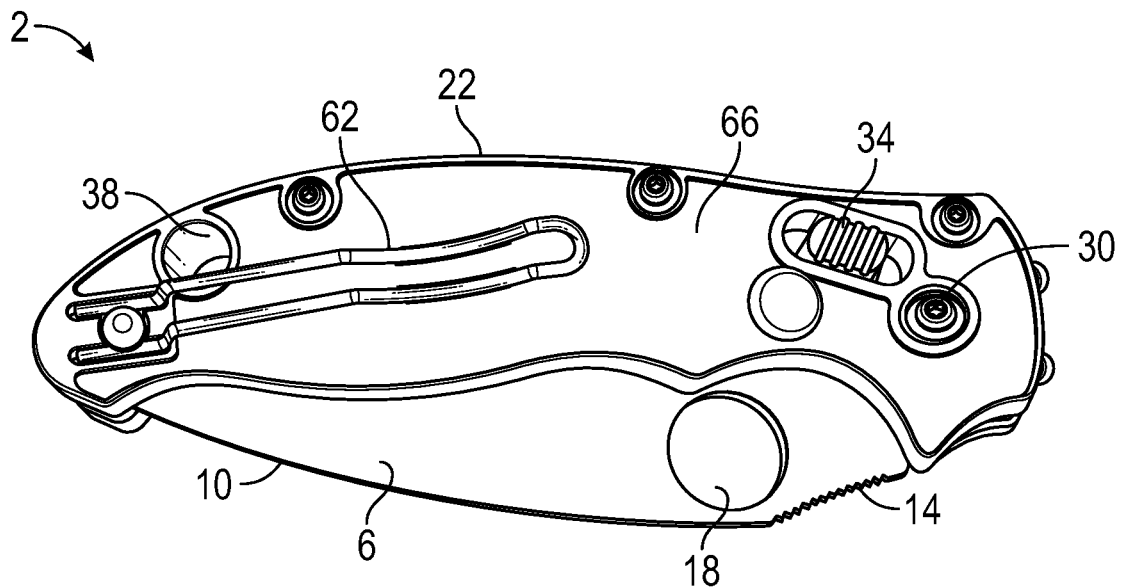
FIG. 2 shows a rear perspective view of the folding knife in FIG. 1A according to an embodiment of the present disclosure.

The handle 22 has a first scale 26 and a second scale 66, which is shown in FIG. 2. The handle 22 also has a lock device 34 that can selectively lock the blade 6 in one or both of the open position and the closed position. The handle 22 further comprises a lanyard aperture 38 through both scales 26, 66 where a user can connect a lanyard or other similar feature to carry or secure the folding knife 2. The handle 22 and scales 26, 66 can be composed of various materials known in the art, for example, wood, metal, composite material, fiberglass, plastic, etc. The scales 26, 66 can be made of a material that promotes the wireless charging of the folding knife 2. In one embodiment, the scales 26, 66 are made from a plastic that allows an electromagnetic wave to reach electronic components within the scales 22, 66. In other embodiments, the scales 22, 66 can comprise a shield that prevents the free transmission of electromagnetic waves except for the electronic components related to the wireless transmission of electrical energy.

In one embodiment, a first light 42a and a second light 42b are positioned at a fore end of the handle 22, and an activation device 46 such as a button can activate the lights 42a, 42b. The lights 42a, 42b illuminate the area in front of the folding knife 2 to assist with a cutting or thrusting action of the blade 6. Pressing the activation device 46 can cause the lights 42a, 42b to illuminate in different ways and in different combinations. For instance, pressing the activation device 46 can cycle the lights 42a, 42b through multiple modes of operation, which can include activating only one light 42a, 42b, activating both lights 42a, 42b, activating one or both lights 42a, 42b with different colors, pulsing one or both lights 42a, 42b to produce a strobe effect, activating one or both lights 42a, 42b with a brighter or less bright intensity, etc. In addition, holding the activation device 46 for a predetermined amount of time (e.g., 1 s, 2 s, 3 s, etc.) can cause the lights 42a, 42b to activate in a yet a further mode or modes of operation.

It will be appreciated that while two lights 42a, 42b are depicted, embodiments of the present disclosure encompass a greater or fewer number of lights 42a, 42b or other devices. In addition, one light 42a can be positioned on one scale and the other light 42b can be position on the other scale. One light 42a can emit, for example, a red light, and one light 42b can emit, for example, a white light. Moreover, embodiments of the present disclosure encompass other devices such as a light, a locking mechanism, an opening mechanism, a microphone, an audio speaker, a GPS beacon or device, a fitness tracker, a heart monitor, a receiver, a transmitter, a transceiver, a pH sensor, a position sensor, a hand warmer, a vibrating mechanism, a camera or video recorder, a communication device, a clock, etc. It will be further appreciated that the activation device 46 can be a button, a switch, a slider switch that moves between more than two positions, a microphone that receives voice commands, etc.

Referring now to FIG. 2, a rear perspective view of the folding knife 2 is provided. Specifically, the second scale 66 of the handle 22 is shown, and a clip 62 is provided that can secure the folding knife 2 in a pocket, a belt, or other location. FIG. 2 also shows the reverse side of the blade 6, the lock device 34, and the lanyard aperture 38.

Figure 3:
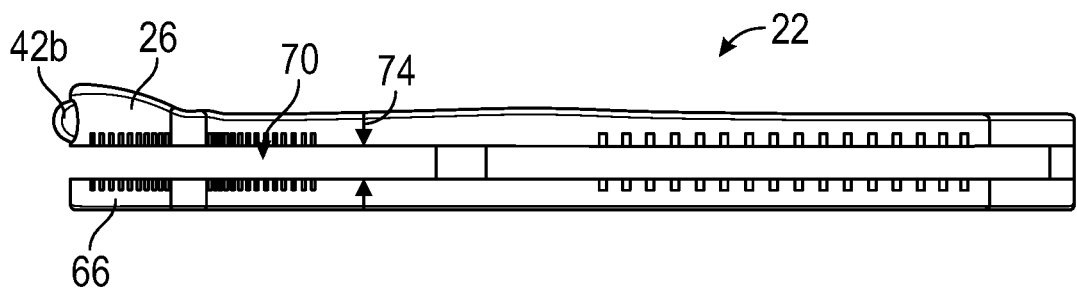
FIG. 3 is a bottom plan view of a handle of the folding knife in FIG. 1A according to an embodiment of the present disclosure.

Referring now to FIG. 3, a bottom plan view of the handle 22 of the folding knife is provided. The first scale 26 and the second scale 66 define a channel 70 that receives the blade when the blade is in the closed position. In other words, the cutting edge of the blade is positioned in the channel 70 when the blade is in the closed position, and the cutting edge of the blade is position outside of the channel 70 when the blade is in the open position. In this view, the channel 70 has a channel width 74. The blade, the first scale 26, and the second scale 66 have substantially planar shapes to preserve the ergonomics and functionality of the handle 22 and the folding knife 2. Thus, the channel width 74 can be on the order of the thickness of one or both of the first scale 26 and the second scale 66 in some embodiments.

Figure 4A:
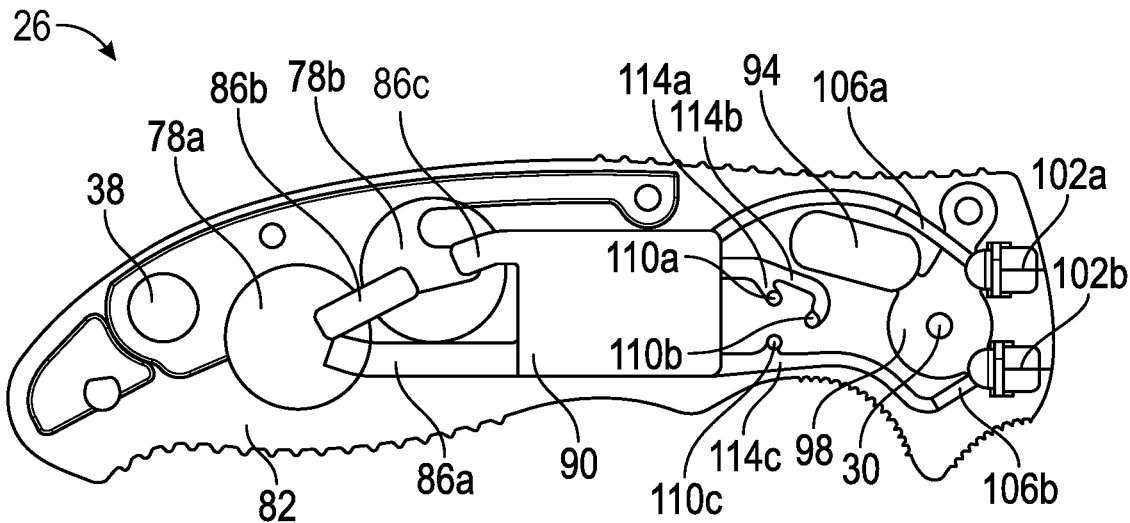
FIG. 4A is a side elevation view of the first scale of a handle of a folding knife according to an embodiment of the present disclosure.
Figure 4B:
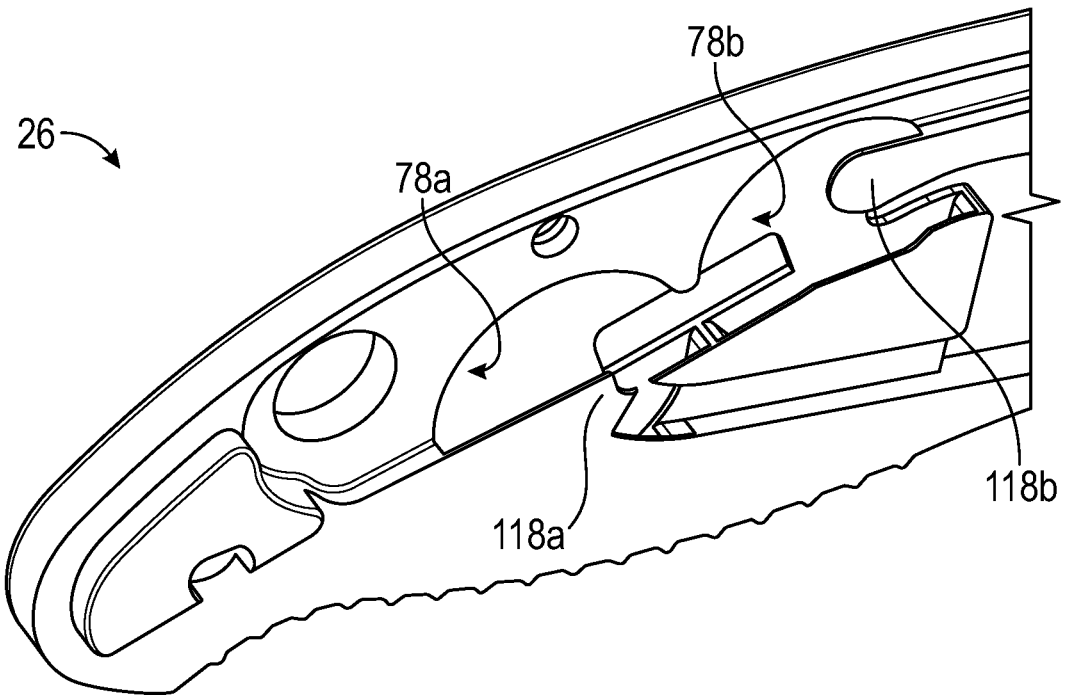
FIG. 4B is a perspective view of a first scale of the handle in FIG. 4A according to an embodiment of the present disclosure.

Referring now to FIGS. 4A and 4B, a side elevation view and a perspective view of an inner surface of the first scale 26 are provided, respectively. A power storage device, a charge component, an activation device, and a device such as a light are arranged in the first scale 26. Corresponding cavities, recesses, and channels extend into the inner surface of the first scale 26 to provide space for these components but are also strategically chosen to leave a remaining reinforcement area 82 that provides strength and stiffness to the first scale 26 and the folding knife.

Two storage cavities 78a, 78b extend into the first scale 26 to receive power storage devices, which can be batteries with planar shapes. Instead of a single battery with a thickness that is too large for the first scale 26, two or more separate batteries can each have a smaller thickness that allows for the batteries to be positioned in the first scale 26 while maintaining the planar ergonomics of the scale 26 and the folding knife. It will be appreciated that the power storage device can be a capacitor or other storage devices, and in addition, the folding knife can have a single storage cavity 78, more than two storage cavities 78, or even a combined cavity in various embodiments. FIG. 4B shows arms 118a, 118b that at least partially extend over an area of the respective storage cavities 78a, 78b. The arms 118a, 118b help retain the batteries inserted into the cavities 78a, 78b and can deflect as the batteries are positioned in place in the cavities 78a, 78b. When a liner, a backspacer 130, a second scale or other component is secured over the inner surface of the first scale 26, the arms 118a, 118b can effectively lock the power storage devices in the cavities 78a, 78b. Moreover, the arms 118a, 118b can have electric contacts to transfer power between the power storage devices and other components within the handle.

Next, a control cavity 90 extends into the inner surface of the first scale 26 to receive a control unit such as a circuit board as well as a charge component such as an inductive coil, a resonator coil, or an RF antenna. In some embodiments, the storage cavity 78 and the control cavity 90 can be combined into a single cavity. Also shown in FIG. 4A are three activation apertures 110a, 110b, 110c that extend through the first scale 26. These apertures 110a, 110b, 110c allow a portion of the activation device to extend between the outer and inner surfaces of the first scale 26 to send a signal to other components within the folding knife. The three apertures 110a, 110b, 110c are arrayed below the activation device so that if the activation device is pressed asymmetrically, then at least one part of the device will register the pressing action and transmit a signal through one of the apertures 110a, 110b, 110c. Two recesses 102a, 102b are positioned at the fore end of the first scale 26, and these recesses 102a, 102b receive the two lights shown in FIGS. 1A and 1B. Note that the control cavity 90 may also be called a charge cavity herein.

Several other recesses and apertures are shown in FIG. 4A. A blade recess 98 receives part of the blade and is centered about the pivot point 30 of the blade. A lock aperture 94 extends through the first scale 26 to receive components of the lock device. The lanyard aperture 38 is also depicted.

Several channels extend into the inner surface of the first scale 26 to link the various components of the folding knife together, and the channels are strategically located to leave a remaining reinforcement area 82 that provides strength and stiffness to the first scale 26 and the folding knife. A first storage channel 86a extends between the control cavity 90 to the first storage cavity 78a, a second storage channel 86b extends between the two storage cavities 78a, 78b, and a third storage channel 86c extends from the second storage cavity 78b back to the control cavity 90. These channels 86a, 86b, 86c can route wires, electric contacts, or otherwise provide electrical communication between the power storage devices and the control unit and/or charge component.

Three activation channels 114a, 114b, 114c extends from respective activation apertures 110a, 110b, 110c to the control cavity 90 to route wires, electric contacts, or otherwise provide electrical communication between the activation device and the control unit and/or charge component. Two device or light channels 106a, 106b extend from respective recesses 102a, 102b to the control cavity 90 to route wires, electric contacts, or otherwise provide electrical communication between a device such as a light and the control unit and/or charge component.

A reinforcement area 82 provides strength and stiffness to the scale 26 and the handle of the folding knife. The first light channel 106a extends between the lock aperture 94 and a top edge of the inner surface to leave a remaining reinforcement area 82 on either side of the first light channel 106a. Two activation channels 114a, 114b merge together, but a remaining reinforcement area 82 is positioned between the merged channels 114a, 114b and the first light channel 106a. Likewise, the second light channel 106b and the third activation channel 114c merge together but leave a remaining reinforcement area 82 on either side of the merged channel. These reinforcement areas 82 provide stiffness and strength to the first scale 26 much like a reinforcing rib as described below with respect to the second scale.

Figure 5A:
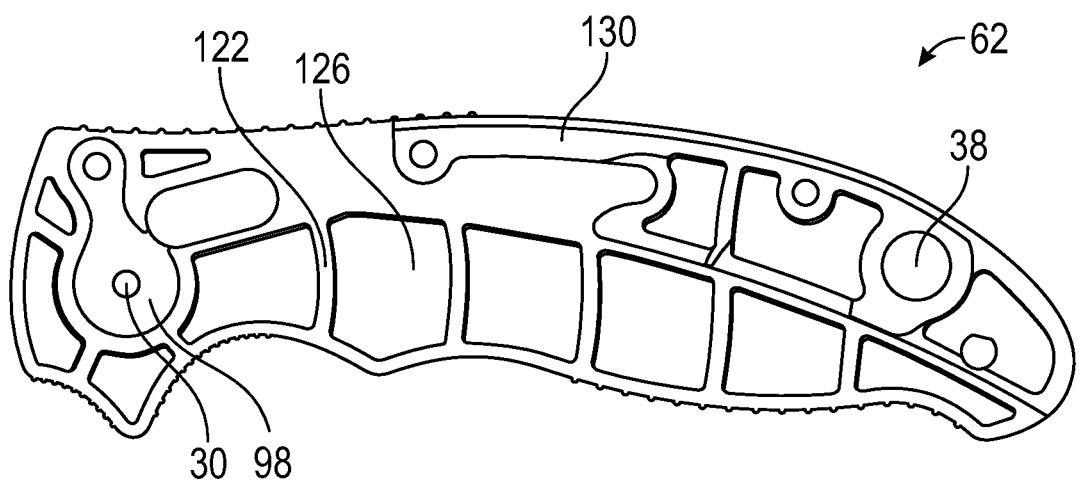
FIG. 5A is a side elevation view of a second scale of a handle of a folding knife according to an embodiment of the present disclosure.
Figure 5B:
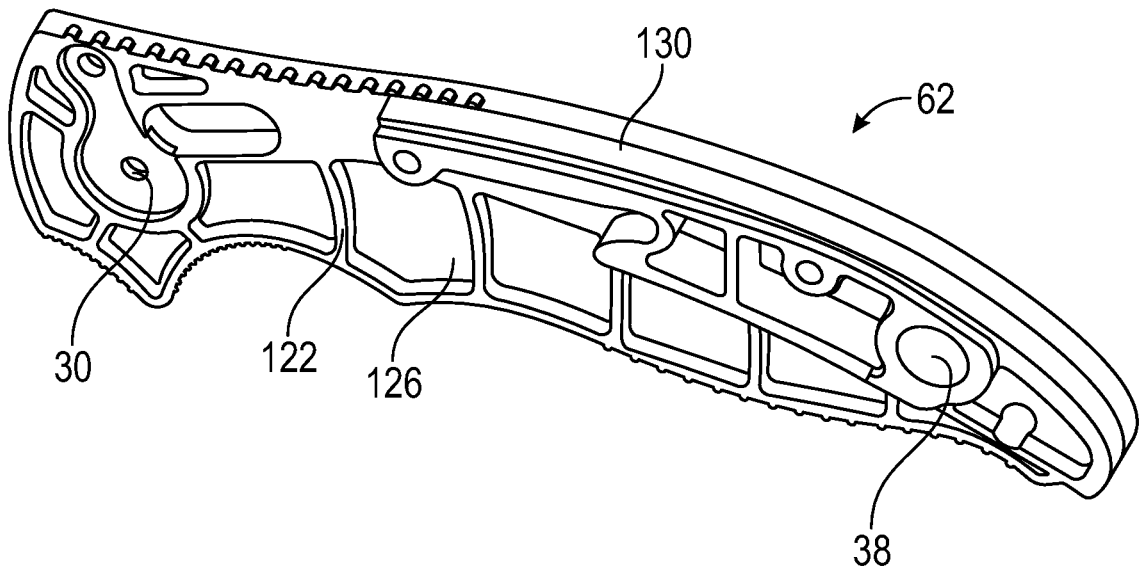
FIG. 5B is a perspective view of the second scale of the handle in FIG. 5A according to an embodiment of the present disclosure.

Referring now to FIGS. 5A and 5B, a side elevation view and a perspective view of an inner surface of the second scale 62 are provided, respectively. Like the first scale, the second scale 62 also has a lanyard aperture 38 and a recess 98 at the fore end where the blade is located. The second scale 62 also has the backspacer 130 that establishes the width of the channel between the scales in this embodiment. Also shown in FIGS. 5A and 5B are the system of cutout areas 126 and ribs 122. The cutout areas 126 remove weight and mass from the second scale 62 and the remaining ribs 122 provide stiffness and strength to the second scale 62. In general terms, the cutout areas 126 can correspond to the cavities, recesses, and channels in the first scale, and the ribs 122 can correspond to the reinforcement area 82 of the first scale 26. However, the cutout areas 126 and ribs 122 in the second scale 62 are more optimized to maximize the cutout areas 126 and minimize the area of the ribs 122 since the components and wires are not housed in the second scale 62 in this embodiment. In other words, the cavities, recesses, and channels in the first scale must accommodate the sizes and shapes of the various components before optimizing to reduce mass and maintain strength and stiffness. This difference between the first scale and the second scale can be reflected by stating that the combined area of the cutouts areas 126 is greater than the combined area of the cavities, recesses, and channels. Conversely, the combined area of the ribs 122 is smaller than the reinforcement areas in the first scale.

In some embodiments, the second scale 62 can include one or more power storage devices to augment the power supply devices in the first scale. In one exemplary embodiment, the second scale 62 has one or more cavities that receive one or more power storage devices, such as batteries or capacitors. A wire can extend from the power storage devices in the second scale 62 to the electrical components in the first scale to supply and receive power from the electrical components. For instance, the wire can extend to the power storage devices in the first scale such that all power storage devices of the folding knife collectively work together to store power from the charge component. In some embodiments, the power storage devices in the second scale 62 can connect to the control unit or the charge component to serve as a back-up power reserve. In addition, in some embodiments, the backspacer 130, liner, electrical contacts, etc. operably connect the power supply devices in the second scale 62 to electrical components in the first scale. In various embodiments, the second scale 62 itself is a power storage device to completely utilize the mass and space of the second scale 62 for storing power. The power storage device can have the pivot recess 98, the backspacer 130, and the lanyard aperture 38 to function as the second scale 62.

Figure 6A:
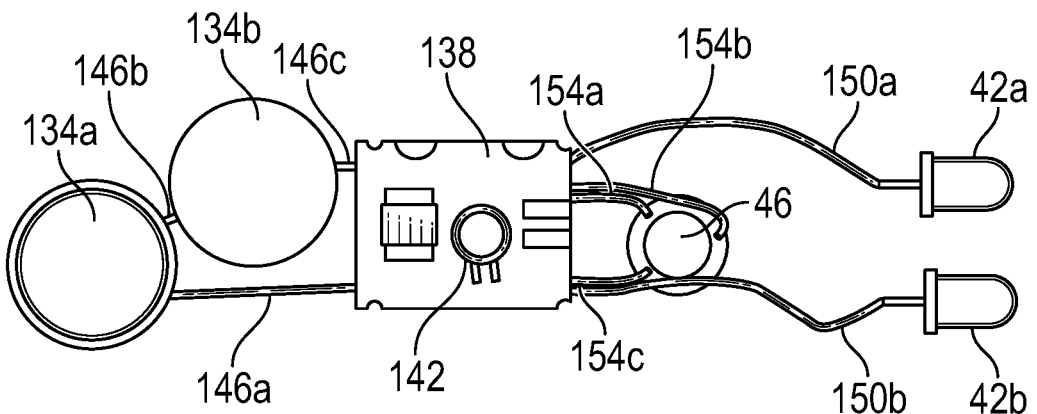
FIG. 6A is a side elevation view of electronic components for a folding knife according to an embodiment of the present disclosure.
Figure 6B:
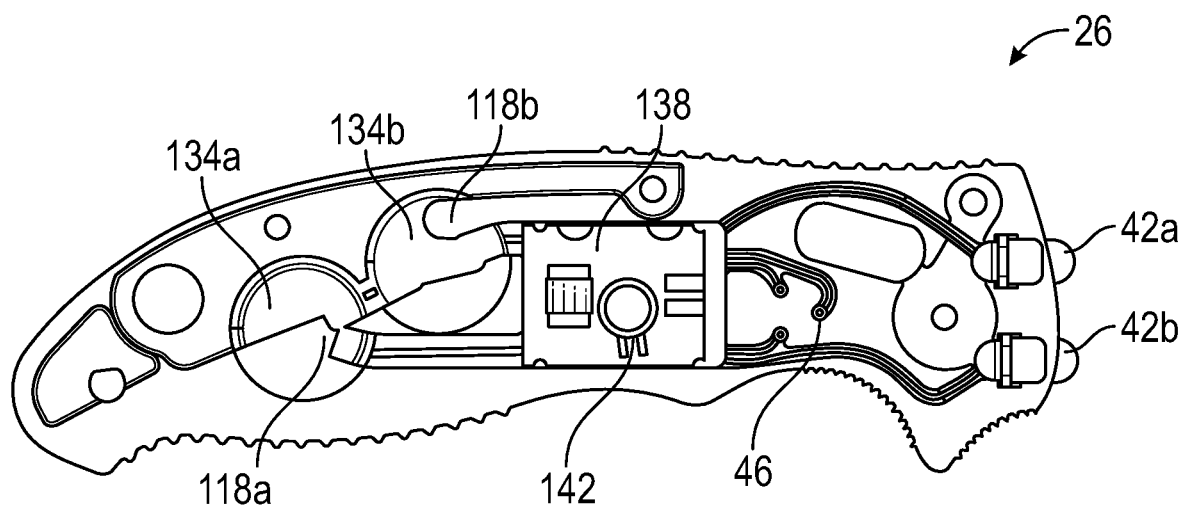
FIG. 6B is a side elevation view of the electronic components in FIG. 6A positioned in a first scale of folding knife according to an embodiment of the present disclosure.

Referring now to FIGS. 6A and 6B, side elevation views of the various components of the folding knife are provided. As shown in FIG. 6A, the folding knife has a control unit 138, which is a circuit board in this embodiment, and a charge component 142, which is an inductor coil in this embodiment. Storage wires 146a, 146b, 146c link the power storage devices 134a, 134b to the control unit 138 and charge component 142. When the folding knife is in the presence of another charge component, power can be wirelessly transmitted to the charge component 142, which charges and recharges the power storage devices 134a, 134b. In this embodiment, the power storage devices 134a, 134b are CR1616 batteries that have a thickness of 1.6 mm and a diameter in the planar direction of 10 mm. Therefore, in some embodiments, the ratio of the thickness to the maximum width in the planar direction can be between eight and twelve. In various embodiments, the ratio is greater than eight. Activation wires 154a, 154b, 154c link the activation device 46 to the control unit 138, and light wires 150a, 150b link the lights 42a, 42b to the control unit 138. In some embodiments, a charge wire can connect to electrical components in the first scale to power the power storage devices 134a, 134b from an external power source. A socket at an outer surface of the first scale can receive a plug to connect the charge wire to the external power source, and a rubber stop can be positioned in the socket when the charge wire is not in use to prevent water or other external elements from penetrating the interior of the first scale.

FIG. 6B shows the various component positioned in the cavities, recesses, and channels of the first scale 26 of the folding knife. The control unit 138, the charge component 142, and the power storage devices 134a, 134b can be sealed from external elements individually or in a single enclosed volume. The components are sealed to prevent fluid, whether gas or liquid, from moving between the enclosed volume and outside of the enclosed volume. Sealants, glues, epoxies, and other similar materials can provide the desired seal.

Figure 7A:
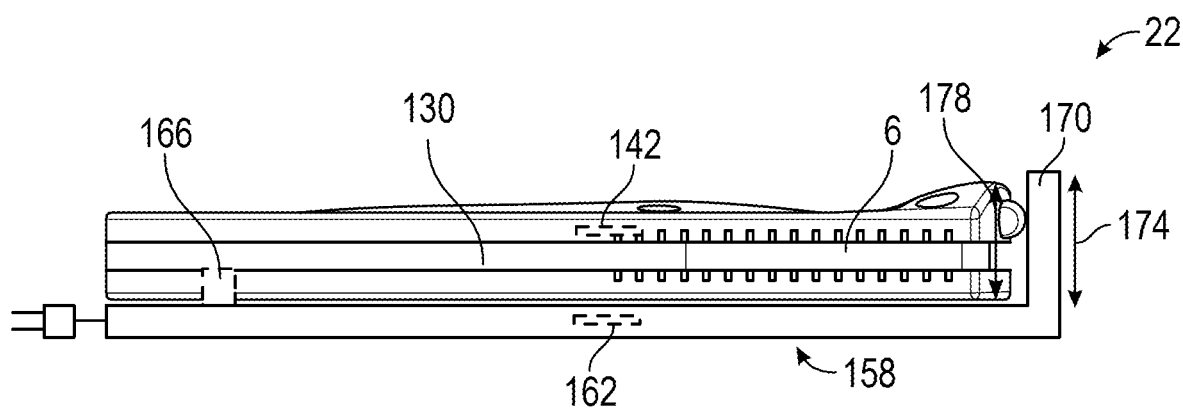
FIG. 7A is a side elevation view of a folding knife and a charge base according to an embodiment of the present disclosure.

Referring now to FIGS. 7A-7D, side elevation views of the folding knife 2 positioned on a charge base 158 are provided. The folding knife 2 and/or charge base 158 can have features that improve the performance of the wireless charging and also improve safety when using the charge base 158. In FIG. 7A, the first charge component 142 in the handle 22 of the folding knife and the second charge component 162 of the charge base 158 are depicted, and a protrusion 166 extending from the charge base 158 into the handle 22 aligns the charge components 142, 162. The protrusion 166 can extend into, for instance, the lanyard aperture of the handle 22 to align the charge components 142, 162. It will be appreciated that the various features depicted in FIGS. 7A-7D are exemplary, and embodiments of the present disclosure include, for instance, a charge base 158 that does not have safety features.

To promote the safety of the user, it can be desirable to keep the blade 6 in the closed position in the handle 22 during charging. If the folding knife 2 is left with the blade 6 open, a user may forget that the blade 6 is open, which can lead to an injury. Moreover, if the folding knife 2 is left with the blade 6 open, a third party such as a child may try to grasp the folding knife 2 without appreciating the cutting edge of the blade 6, which can lead to an injury. A wing 170 can extend upward from the charge base 158 proximate to the fore end of the handle 22. The height 174 of the wing 170 can be greater than the width 178 of the handle 22 in some embodiments. Thus, when the blade 6 is in the open position, the wing 170 contacts the blade 6 and prevents the first charge component 142 from being positioned close enough to second charge component 162 to wirelessly receive power. Therefore, the user must first position the blade 6 in the closed position before the second charge component 162 can wirelessly transmit power to the first charge component 142. In further embodiments, the charge base 158 can define a cutout area that corresponds to the area of the folding knife 2 with the blade 6 in the closed position. Therefore, unless the blade 6 is closed, then the folding knife 2 cannot be properly positioned in the cutout area in the charge base 158 and wireless power transmission cannot begin.

Figure 7B:
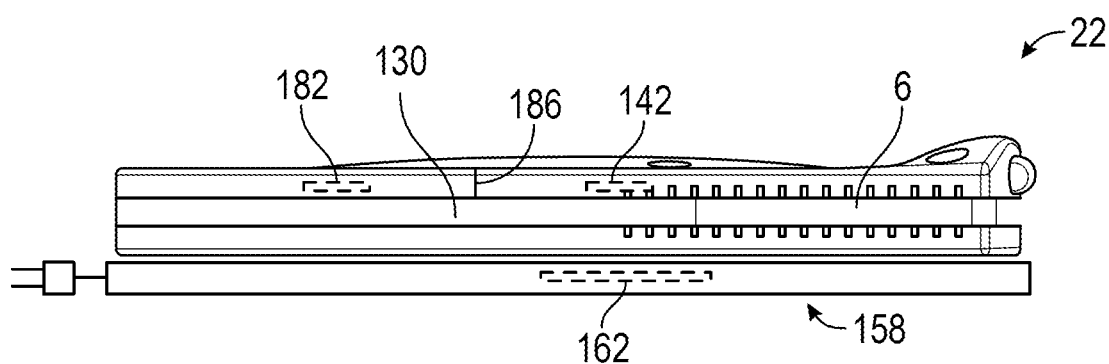
FIG. 7B is a side elevation view of another folding knife and a charge base according to an embodiment of the present disclosure.

In FIG. 7B, the second charge component 162 can have a larger cross sectional area than the first charge component 142 such that a user does not need to precisely locate the folding knife on the charge base 158 to initiate the charging process. Also shown in FIG. 7B is a position sensor 182 that can detect the position of the blade 6, and more specifically, when the blade 6 is in the closed position within the handle 22 or when the blade 6 is positioned outside of the handle 22. A shield 186 can be positioned between the first charge component 142 and the position sensor 182 to prevent electromagnetic fields from affecting either of the first charge component 142 or the position sensor 182. The position sensor 182 can serve a variety of functions. For instance, the position sensor 182 can be electrically connected to the control unit, and if the blade 6 is not positioned in the handle 22, then the control unit does not transmit power from the first charge component 142 to the power storage devices. The position sensor 182 can be located in a variety of positions in the folding knife 2 and can serve a variety of functions. For instance, the position sensor 182 can detect when the blade 6 can moved from the closed position to the open position, and then the position sensor 182 can send a signal to the control unit, which then activates, for instance, a light.

Figure 7C:
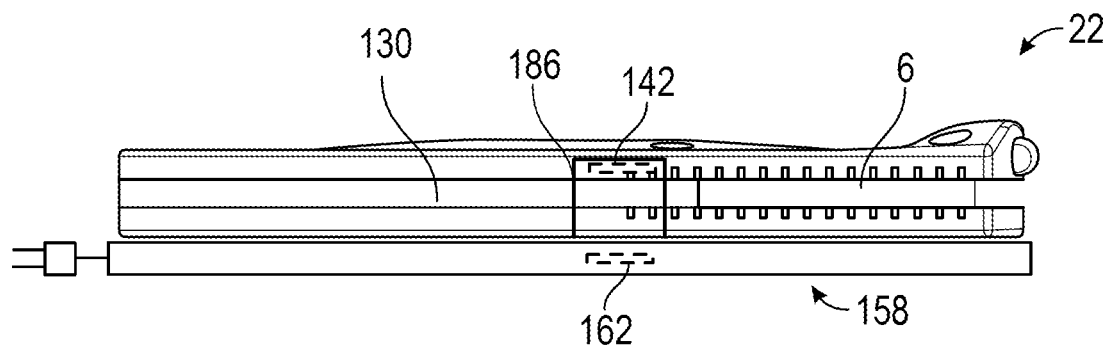
FIG. 7C is a side elevation view of a further folding knife and a charge base according to an embodiment of the present disclosure.

In FIG. 7C, the shield 186 can extend around one or more sides of the first charge component 142 to both insulate the first charge component 142 from external electromagnetic fields and also protect external components from the wireless transmission of power from the second charge component 162 to the first charge component 142. In addition, the shield 186 in this embodiment can prevent the wireless transmission of power until the charge components 142, 162 are precisely aligned over each other, which ensures a more efficient transmission of power.

Figure 7D:
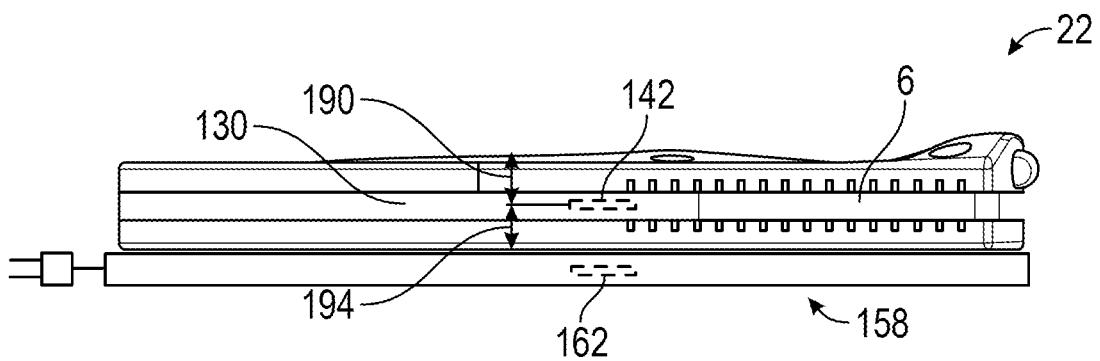
FIG. 7D is a side elevation view of another folding knife and a charge base according to an embodiment of the present disclosure.

In FIG. 7D, the first charge component 142 is offset 190 from the outer surface of the first scale and offset 194 from the outer surface of the second scale. Some wireless protocols for the transmission of power have maximum ranges between charge components 142, 162. Thus, in some embodiments, the offsets 190, 194 are less than 5 cm in some embodiments. It will be appreciated that the offsets 190, 194 can be less than the maximum range of a protocol (e.g., 3 cm, etc.). Moreover, it can be advantageous to have the folding knife charge when one scale is positioned against the charge base 158 but not when the other scale is positioned against the charge base 158. Therefore, in some embodiments, the first offset 190 is greater than 4 cm and the second offset 194 is less than 5 cm, or vice versa, when the maximum range of the wireless protocol is 4 cm.

Figure 8:
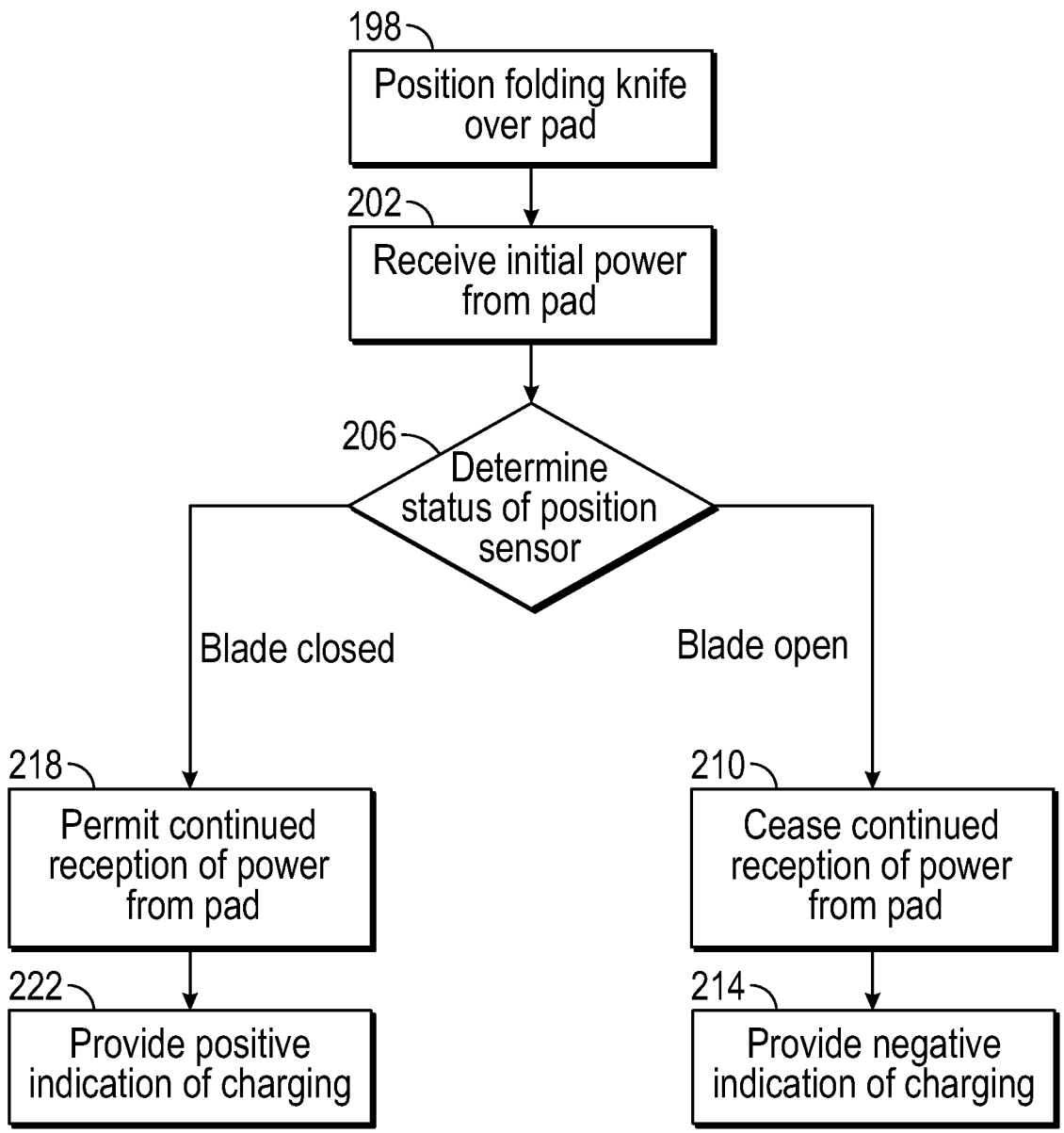
FIG. 8 is a flow chart for operation of a folding knife positioned on a charge base according to an embodiment of the present disclosure.

Referring now to FIG. 8, a flowchart for operation of the charging system is provided. First, the folding knife is positioned 198 over or on the charge base. Then, the folding knife can initially 202 receive some power to determine 206, for example by the position sensor, if the blade is safely in the closed position in the handle. In some embodiments, the folding knife can rely on the power storage device to power the position sensor and control unit. If the blade is open, then the folding knife, specifically a control unit, can cease 210 charging the power storage device in the folding knife. In various embodiments, an electronic component of the folding knife sends a signal to the charge base such that the charge base prevents the transmission of power to the folding knife. Then, the folding knife can provide 214 a negative indication of charging. In some embodiments, one of the lights emits a red or orange light, indicating caution that the blade is in the open position. If the blade is closed, then the folding knife can continue 218 charging the power storage device in the folding knife. Moreover, the folding knife can provide 222 a positive indication of charging. In various embodiments, one of the lights emits a green light, indicating that the blade is safely in the closed position.

Although the figures depict a folding knife, it will be appreciated that embodiments of the present disclosure encompass a variety of tools and tool handles. For instance, embodiments of the present disclosure encompass a fixed blade knife with a handle that can incorporate various aspects of the present disclosure including the sealed, planar power storage device and charge component, the arrangement of channels and reinforcement area, and the charge base. Thus, embodiments of the present disclosure encompass fixed blade knives, multi-tools, saws, drills, and any other tool with a handle that can incur the benefits of aspects described herein.

The foregoing description of the present disclosure has been presented for illustration and description purposes. However, the description is not intended to limit the disclosure to only the forms disclosed herein. In the foregoing Detailed Description for example, various features of the disclosure are grouped together in one or more embodiments for the purpose of streamlining the disclosure. This method of disclosure is not to be interpreted as reflecting a disclosure that the claims require more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the disclosure.

Consequently, variations and modifications commensurate with the above teachings and skill and knowledge of the relevant art are within the scope of the present disclosure.

The embodiments described herein above are further intended to explain best modes of practicing the disclosure and to enable others skilled in the art to utilize the disclosure in such a manner, or include other embodiments with various modifications as required by the particular application(s) or use(s) of the present disclosure. Thus, it is intended that the claims be construed to include alternative embodiments to the extent permitted by the prior art.

What is claimed is:

1. A folding knife that wirelessly receives power from a remote source, comprising:
   a handle having a first scale and a second scale that define a blade channel positioned therebetween, and a control cavity offset from an outer surface of the first scale and offset from an outer surface of the second scale, wherein said control cavity is in said first scale;
   a blade pivotally interconnected to a forward end of said handle, wherein said blade has a cutting edge, said blade is movable between a first closed position where said cutting edge is positioned in said blade channel and a second extended position where said cutting edge is positioned outside of said blade channel; and
   a charge component positioned in said control cavity for wirelessly receiving power and transferring power to a power storage device positioned in said handle, wherein said charge component and said power storage device each have a substantially planar shape, and wherein said substantially planar shapes of said power storage device, said charge component, and said first scale are oriented in a common direction,
   wherein said second scale includes a cutout area that aligns with said control cavity in said first scale, and
   wherein said second scale includes at least two ribs that are adjacent to said cutout area and that align with at least one reinforcement area in said first scale.

2. The folding knife of claim 1, wherein said charge component is one of an inductive coil, a resonator coil, and an RF antenna.

3. The folding knife of claim 1, wherein said power storage device is one of a battery or a capacitor.

4. The folding knife of claim 1, wherein said planar shape of said power storage device has a ratio between a maximum dimension in a planar direction to a maximum dimension in a thickness direction that is greater than eight.

5. The folding knife of claim 1, further comprising a device electrically connected to a control unit, wherein at least one of said first scale, said second scale, a liner, a liner lock, a back lock, a pivot tie, or a split spring provides said electrical connection between said device and said control unit.

6. The folding knife of claim 1, wherein said power storage device is positioned in a storage cavity in said first scale, and a storage channel extends between said storage cavity and said control cavity.

* * * * *